(12) United States Patent
Richards et al.

(10) Patent No.: US 9,905,168 B1
(45) Date of Patent: Feb. 27, 2018

(54) LUMINANCE-BASED NON-UNIFORMITY CORRECTION FOR DISPLAY PANELS IN HEAD-MOUNTED DISPLAYS

(71) Applicant: Oculus VR, LLC, Menlo Park, CA (US)

(72) Inventors: Evan M. Richards, Santa Clara, CA (US); Andrew T. Forsyth, Kirkland, WA (US); Shizhe Shen, San Mateo, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/980,793

(22) Filed: Dec. 28, 2015

(51) Int. Cl.
| | |
|---|---|
| *G02B 27/01* | (2006.01) |
| *G09G 3/34* | (2006.01) |
| *G09G 3/36* | (2006.01) |
| *G09G 3/3225* | (2016.01) |
| *G06T 19/00* | (2011.01) |

(52) U.S. Cl.
CPC ....... *G09G 3/3406* (2013.01); *G02B 27/0172* (2013.01); *G06T 19/006* (2013.01); *G09G 3/3225* (2013.01); *G09G 3/3648* (2013.01); *G02B 2027/014* (2013.01); *G02B 2027/0116* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 2007/0070085 A1* | 3/2007 | Yamagata | G09G 3/20 345/606 |
| 2015/0161941 A1* | 6/2015 | Lim | G09G 3/3208 345/691 |
| 2016/0091720 A1* | 3/2016 | Stafford | G02B 27/0172 345/8 |
| 2016/0300527 A1* | 10/2016 | Piper | G09G 3/3233 |
| 2017/0140711 A1* | 5/2017 | Zhang | G09G 3/3426 |

\* cited by examiner

*Primary Examiner* — Kee M Tung
*Assistant Examiner* — Yanna Wu
(74) *Attorney, Agent, or Firm* — Fenwick & West LLP

(57) ABSTRACT

A method for correcting non-uniformities of one or more display panels of a HMD (e.g., a VR headset or an AR headset) is disclosed, where the method is based on a luminance level of content being displayed. The method includes obtaining the calibration data for correcting non-uniformity of a display panel of the HMD at various brightness levels and storing the data. In response to receiving a request for providing content to be presented on the HMD, the host applies the calibration data based on a luminance level of content being rendered to correct for any non-uniformities of the one or more display panels while rendering the content for display.

18 Claims, 6 Drawing Sheets

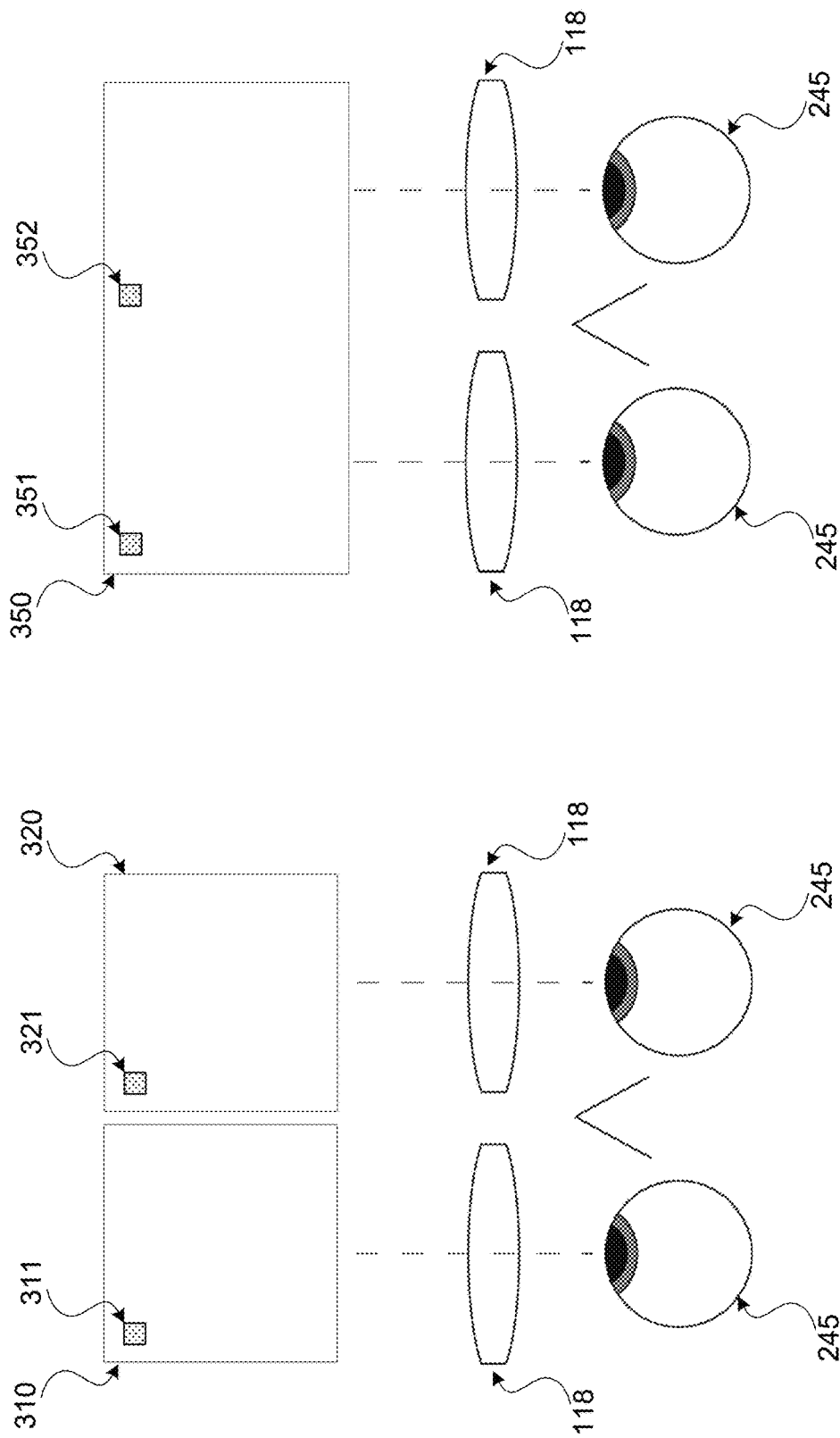

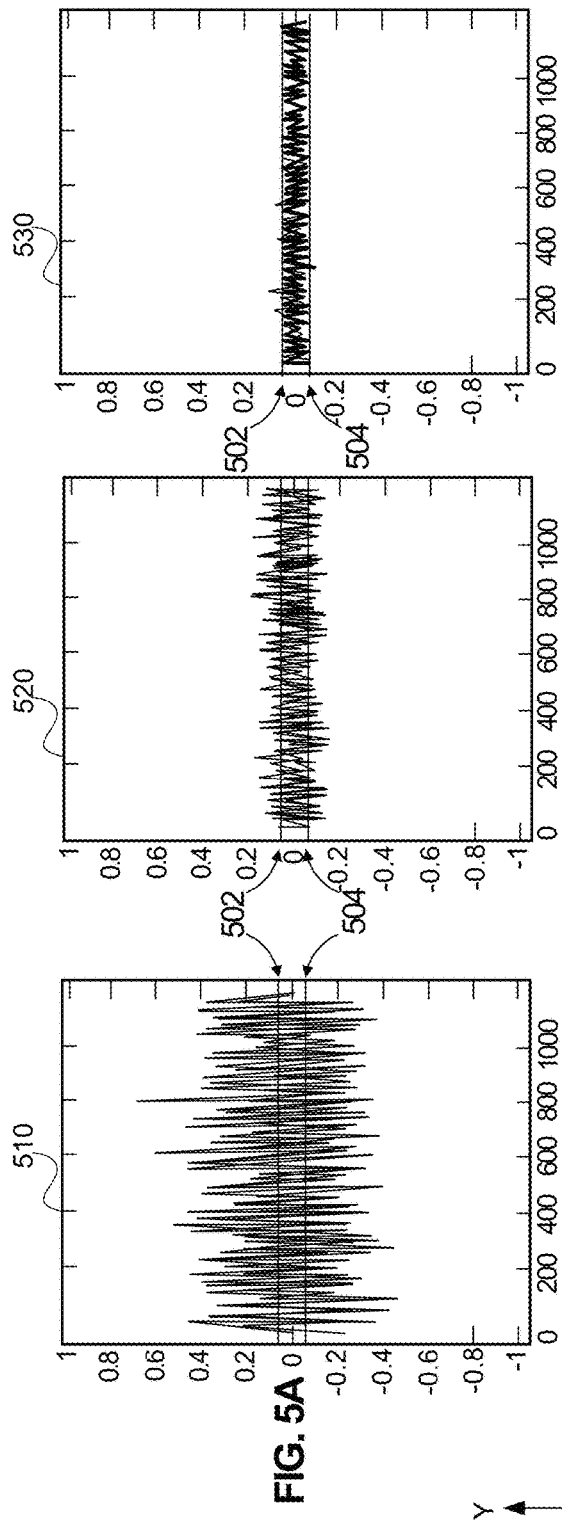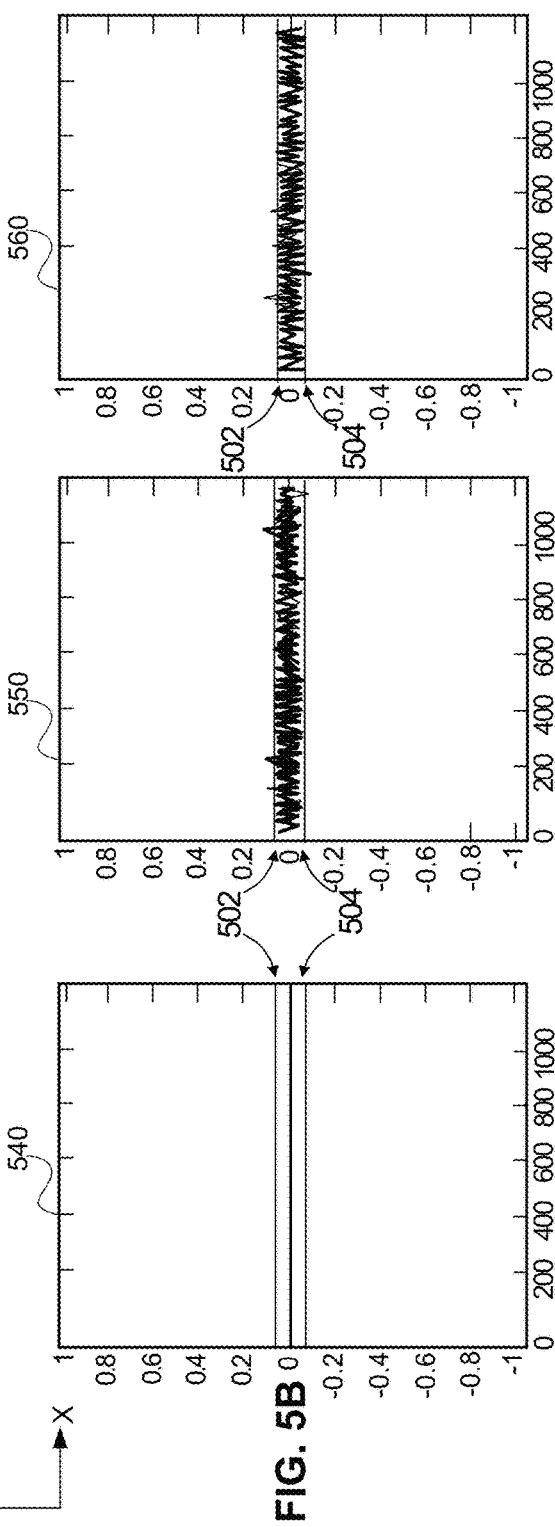
FIG. 5A
FIG. 5B

LUMINANCE-BASED NON-UNIFORMITY CORRECTION FOR DISPLAY PANELS IN HEAD-MOUNTED DISPLAYS

BACKGROUND

The present disclosure generally relates to display panels in head-mounted displays (HMDs), and specifically to correcting non-uniformity errors in such display panels.

HMDs may be used to present augmented and/or virtual information to a user. For example, a virtual reality (VR) headset can be used to simulate virtual environments. During a manufacturing process of the HMDs, there may be some non-uniformity that exists across any individual display panel as well as across panels of the HMDs. HMDs may use two display panels to present information to the user with each display panel presenting information to each eye. In order to create a stereoscopic image, images displayed on the left and right panels are fused together (overlaid) to create a perception of depth. It is desirable that the corresponding points between the two display panels have the same color and brightness. If non-uniformity exists between the brightness (or luminance) of corresponding pairs of pixels or between color matching of corresponding pairs of sub-pixels of the left and right display panels, the user's eyes may not be able to fuse the images together properly, causing eye strain on the user. Any such non-uniformity is corrected by applying non-uniformity calibration data while a host system renders content for display on the HMDs.

The non-uniformity in display panels becomes more or less noticeable as its luminance level varies, such that panels displaying content at lower luminance levels have more noticeable non-uniformity relative to when displaying content at higher luminance levels. Conventionally, non-uniformity calibration is applied at a reference luminance level for content irrespective of a luminance level of the content being displayed on the HMD, reducing user experience.

SUMMARY

A method for correcting non-uniformities of one or more display panels of a HMD (e.g., a VR headset or an AR headset) is disclosed, where the method is based on a luminance level of content being displayed. The method includes obtaining calibration data for correcting non-uniformity of a display panel of the HMD at various brightness levels and storing the data. In response to receiving a request for providing content to be presented on the HMD, a host applies the calibration data based on a luminance level of content being rendered to correct for any non-uniformities of the one or more display panels while rendering the content for display. The non-uniformity calibration data may include correction voltages for drive voltages of thin film transistors (TFTs) that drive pixels of the display panel, where the correction voltages represent a change in drive voltages of the TFTs to correct non-uniformities of the pixels.

The host may apply non-uniformity calibration by applying a full calibration for content below or equal to a first threshold brightness level and by applying a partial calibration for content above the first threshold brightness level. For example, the first threshold brightness level may be level 25 of a brightness scale of 0 to 255, with level 0 representing black and level 255 representing white. An example full calibration includes changing a drive voltage for a first pixel displaying content at a first brightness level, where the drive voltage change for the first pixel represents a full amount of a first correction voltage corresponding to the first pixel. The first correction voltage is derived from calibration data corresponding to the first brightness level, where the first brightness level is below or equal to the first threshold brightness level.

The partial calibration may include changing a drive voltage for a second pixel displaying content at a second brightness level, where the drive voltage change for the second pixel represents a partial amount of a second correction voltage corresponding to the second pixel. The second correction voltage is derived from calibration data corresponding to the second brightness level, where the second brightness level is above the first threshold brightness level.

In some embodiments, the host may correct non-uniformity of pixels at brightness levels less than the first threshold brightness level (e.g., level 0 through 24 when the first threshold brightness level is level 25) with a correction amount that is greater than 100% of the actual data corresponding to those pixels in the non-uniformity calibration file. For example, the non-uniformity calibration file might indicate that the correction needed for a pixel at brightness level 15 equates to a correction voltage of 5 mV for the drive voltage driving its corresponding TFT. As the brightness level of the pixel is less than that of the first threshold brightness level, the actual correction voltage applied to the pixel is greater than 5 mV and may be 110% of 5 mV (i.e., 5.5 mV).

In some embodiments, the non-uniformity calibration may include changing the display data values corresponding to the pixels instead of changing the analog drive voltages of the TFTs that drive the pixels.

The host may reduce an amount of partial calibration as the luminance level increases. For example, the partial calibration may include changing the drive voltage by a first percentage of the second correction voltage when the second pixel is configured to display content at the second brightness level, and changing the drive voltage by a second percentage of the second correction voltage when the second pixel is configured to display content at a third brightness level that is higher than the second brightness level, where the second percentage is lower than the first percentage. For example, the second brightness level may be level 90 and the third brightness level may be level 240. The amount of correction for the second pixel at level 90 is a higher percentage of the second correction voltage (e.g., 20%) than the amount of correction at level 240 (e.g., 10%). In some embodiments, the host applies no calibration for content above or equal to a second threshold brightness level (e.g., level 255), where the second threshold brightness level is higher than the first threshold brightness level.

Performing non-uniformity calibration based on a dynamic selection of a brightness level (e.g., different brightness levels for different frames of the presented content) provides flexibility for such calibration. If the brightness level of the content being presented to the user is predominantly centered on a brightness level that keeps changing with the presented content, an ability to dynamically select the brightness level for non-uniformity calibration provides flexibility to change the non-uniformity calibration as needed. Luminance-based non-uniformity calibration of the display panels allows the host to perform non-uniformity calibration only as needed. As discussed above, the host may perform full calibration for pixels below (or equal to) the first threshold brightness level and may perform partial calibration for pixels above the first threshold brightness level.

BRIEF DESCRIPTION OF THE DRAWINGS

FIG. 3A shows a block diagram of a HMD with two separate display panels, in accordance with at least one embodiment.

FIG. 3B shows a block diagram of a HMD with a single display panel, in accordance with at least one embodiment.

FIG. 5A shows non-uniformity of a display panel at three different luminance levels before applying non-uniformity calibration, in accordance with an embodiment.

FIG. 5B shows non-uniformity of the display panel of FIG. 5A at the three different luminance levels after applying non-uniformity calibration, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
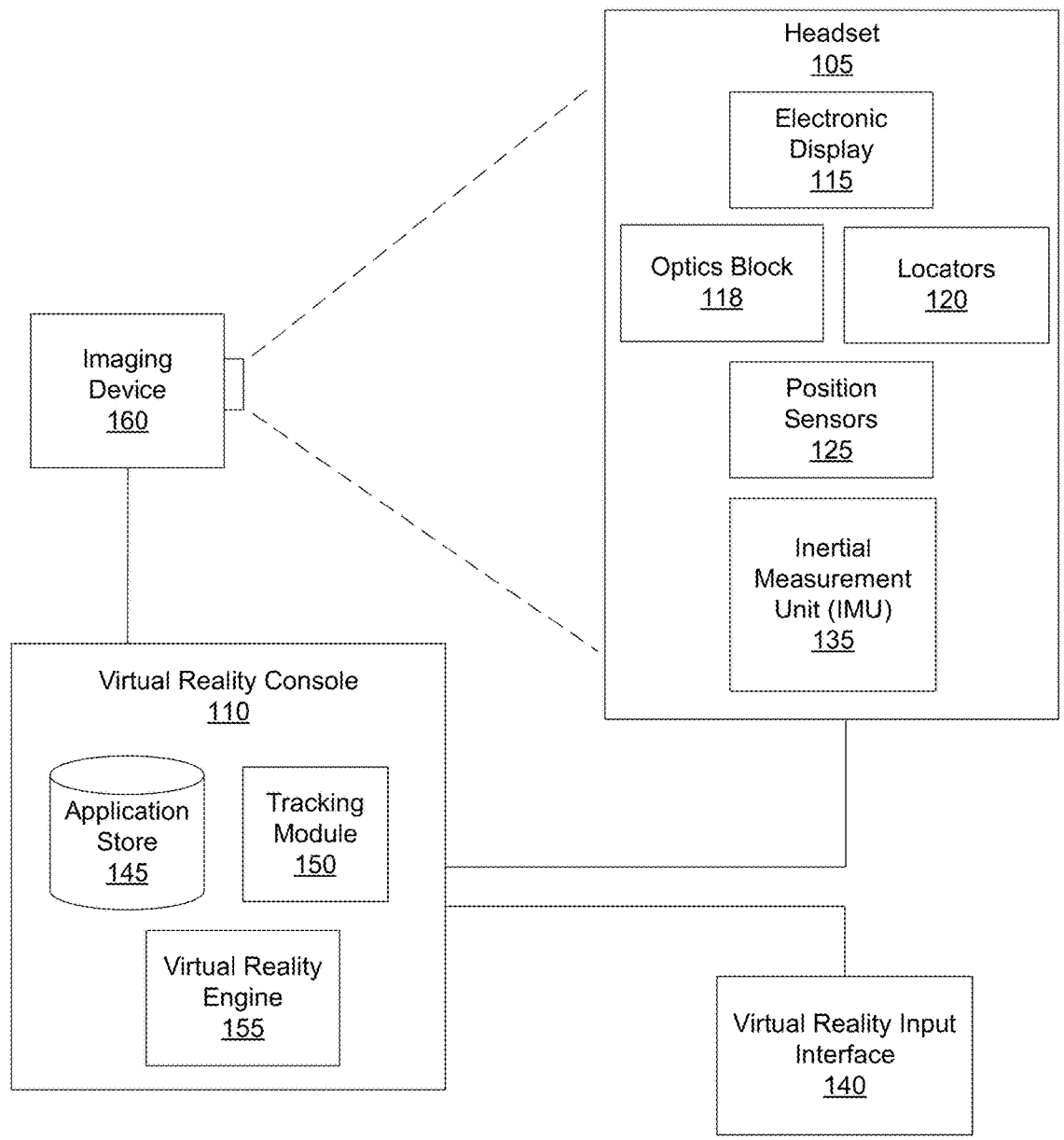
FIG. 1 shows an example VR system, in accordance with at least one embodiment.

FIG. 1 is a VR system environment in which a VR console 110 operates. In this example, the VR system environment includes a headset 105, an imaging device 160, and a VR input interface 140, which are each coupled to a VR console 110. While FIG. 1 shows a single headset 105, a single imaging device 160, and a single VR input interface 140, in other embodiments, any number of these components may be included in the system. For example, there may be multiple headsets 105 each having an associated VR input interface 140 and being monitored by one or more imaging devices 160, with each headset 105, VR input interface 140, and imaging devices 160 communicating with VR console 110. In alternative configurations, different and/or additional components may also be included in the VR system environment. While system environment of FIG. 1 is described in a VR context, the system environment of FIG. 1 may also be part of other HMD systems such as, for example, an AR system environment.

The headset 105 is a Head-Mounted Display (HMD) that presents content to a user. Example content includes images, video, audio, or some combination thereof. Audio content may be presented via a separate device (e.g., speakers and/or headphones) external to the headset 105 that receives audio information from the headset 105, the VR console 110, or both. The headset 105 includes an electronic display 115, an optics block 118, one or more locators 120, position sensors 125, and an internal measurement unit (IMU) 135. In some embodiments, the headset 105 may act as a VR headset or an AR headset. While the headset 105 is described in FIG. 1 in a VR context as part of a VR system environment, the headset 105 may also be part of other HMD systems such as, for example, an AR system environment. In embodiments that describe AR system environment, the headset 105 augments views of a physical, real-world environment with computer-generated elements (e.g., images, video, sound, etc.). An embodiment of the headset 105 is further described below in conjunction with FIGS. 2A and 2B. The headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The electronic display 115 displays images to the user in accordance with data received from the VR console 110. In various embodiments, the electronic display 115 may comprise a single display panel or multiple display panels (e.g., a display panel for each eye of a user). Examples of the electronic display 115 include: a liquid crystal display (LCD), an organic light emitting diode (OLED) display, an active-matrix organic light-emitting diode display (AMOLED), some other display, or some combination thereof.

During a manufacturing process of the electronic display 115 that includes one or more display panels, there may be some non-uniformity that exists across any individual display panel as well as across panels. For example, non-uniformities may arise due to one or more of: threshold voltage variation of TFTs that drive pixels of the display panels, mobility variation of the TFTs, aspect ratio variations in the TFT fabrication process, power supply voltage variations across panels (e.g., IR-drop on panel power supply voltage line), and age-based degradation. The non-uniformities may also include TFT fabrication process variations from lot-to-lot (e.g., from one lot of wafers used for fabricating the TFTs to another lot of wafers) and/or TFT fabrication process variations within a single lot of (e.g., die-to-die variations on a given wafer within a lot of wafers). The nature of non-uniformity could be in either brightness characteristics (e.g., if there are dim portions when displaying a solid single color image) or color characteristics (e.g., if the color looks different when displaying a solid single color image). These non-uniformities may be corrected during run time while rendering content to the headset 105 as described below in conjunction with FIGS. 4 and 6.

The electronic display 115 includes a plurality of pixels, which may each include a plurality of sub-pixels (e.g., a red sub-pixel, a green sub-pixel, etc.), where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display 115 operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

The optics block 118 directs light from the electronic display 115 to an exit pupil for viewing by a user using one or more optical elements, such as apertures, Fresnel lenses, convex lenses, concave lenses, filters, and so forth, and may include combinations of different optical elements. In some embodiments, one or more optical elements in the optics block 118 may have one or more coatings, such as anti-reflective coatings. Magnification of the image light by the optics block 118 allows the electronic display 115 to be physically smaller, weigh less, and consume less power than larger displays. Additionally, magnification of the image light may increase a field of view of the displayed content. For example, the field of view of the displayed content is such that the displayed content is presented using almost all (e.g., 110 degrees diagonal), and in some cases, all of the user's field of view.

The optics block 118 may be designed to correct optical error, such as two-dimensional optical errors, three dimensional optical errors, or some combination thereof. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the headset 105 relative to one another and relative to a specific reference point on the headset 105. Locator 120 may be a light emitting diode (LED), a corner cube reflector, a reflective marker, a type of light source that contrasts with an environment in which the headset 105 operates, or some combination thereof. Active locators 120 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 120 can be located beneath an outer surface of the headset 105, which is transparent to the wavelengths of light emitted or reflected by the locators 120 or is thin enough not to substantially attenuate the wavelengths of light emitted or reflected by the locators 120. Further, the outer surface or other portions of the headset 105 can be opaque in the visible band of wavelengths of light. Thus, the locators 120 may emit light in the IR band while under an outer surface of the headset 105 that is transparent in the IR band but opaque in the visible band.

The IMU 135 is an electronic device that generates fast calibration data based on measurement signals received from one or more of the position sensors 125, which generate one or more measurement signals in response to motion of the headset 105. Examples of the position sensors 125 include accelerometers, gyroscopes, magnetometers, other sensors suitable for detecting motion, correcting error associated with the IMU 135, or some combination thereof. The position sensors 125 may be located external to the IMU 135, internal to the IMU 135, or some combination thereof.

Based on the measurement signals from the position sensors 125, the IMU 135 generates fast calibration data indicating an estimated position of the headset 105 relative to an initial position of the headset 105. For example, the position sensors 125 include multiple accelerometers to measure translational motion (forward/back, up/down, left/right) and multiple gyroscopes to measure rotational motion (e.g., pitch, yaw, roll). The IMU 135 can, for example, rapidly sample the measurement signals and calculate the estimated position of headset 105 from the sampled data. For example, the IMU 135 integrates measurement signals received from the accelerometers over time to estimate a velocity vector and integrates the velocity vector over time to determine an estimated position of a reference point on headset 105. The reference point is a point that may be used to describe the position of the headset 105. While the reference point may generally be defined as a point in space, in various embodiments, reference point is defined as a point within the headset 105 (e.g., a center of the IMU 130). Alternatively, the IMU 135 provides the sampled measurement signals to the VR console 110, which determines the fast calibration data.

The IMU 135 can additionally receive one or more calibration parameters from the VR console 110. As further discussed below, the one or more calibration parameters are used to maintain tracking of the headset 105. Based on a received calibration parameter, the IMU 135 may adjust one or more IMU parameters (e.g., sample rate). In some embodiments, certain calibration parameters cause the IMU 135 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The imaging device 160 generates slow calibration data in accordance with calibration parameters received from the VR console 110. Slow calibration data includes one or more images showing observed positions of the locators 120 that are detectable by the imaging device 160. The imaging device 160 may include one or more cameras, one or more video cameras, other devices capable of capturing images including one or more locators 120, or some combination thereof. Additionally, the imaging device 160 may include one or more filters (e.g., for increasing signal to noise ratio). The imaging device 160 is configured to detect light emitted or reflected from the locators 120 in a field of view of the imaging device 160. In embodiments where the locators 120 include passive elements (e.g., a retroreflector), the imaging device 160 may include a light source that illuminates some or all of the locators 120, which retro-reflect the light towards the light source in the imaging device 160. Slow calibration data is communicated from the imaging device 160 to the VR console 110, and the imaging device 160 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided by the VR input interface 140 when an action request is received, or the VR console 110 communicates instructions to the VR input interface 140 causing the VR input interface 140 to generate haptic feedback when the VR console 110 performs an action.

The VR console 110 provides content to the headset 105 for presentation to the user in accordance with information received from the imaging device 160, the headset 105, or the VR input interface 140. In the example shown in FIG. 1, the VR console 110 includes an application store 145, a tracking module 150, and a VR engine 155. Some embodiments of the VR console 110 have different or additional modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the headset 105 or the VR interface device 170. Examples of applications include gaming applications, conferencing applications, video playback application, or other suitable applications.

The tracking module 150 calibrates the VR system using one or more calibration parameters and may adjust one or more calibration parameters to reduce error in determining position of the headset 105. For example, the tracking module 150 adjusts the focus of the imaging device 160 to obtain a more accurate position for observed locators 120 on the headset 105. Moreover, calibration performed by the tracking module 150 also accounts for information received from the IMU 135. Additionally, if tracking of the headset 105 is lost (e.g., the imaging device 160 loses line of sight of at least a threshold number of the locators 120), the tracking module 150 re-calibrates some or all of the VR system components.

Additionally, the tracking module 150 tracks the movement of the headset 105 using slow calibration information from the imaging device 160 and determines positions of a reference point on the headset 105 using observed locators from the slow calibration information and a model of the headset 105. The tracking module 150 also determines positions of the reference point on the headset 105 using position information from the fast calibration information from the IMU 135 on headset 105. Additionally, the tracking module 150 may use portions of the fast calibration information, the slow calibration information, or some combination thereof, to predict a future location of the headset 105, which is provided to the VR engine 155.

The VR engine 155 executes applications within the VR system and receives position information, acceleration information, velocity information, predicted future positions, or some combination thereof for the headset 105 from the tracking module 150. Based on the received information, the VR engine 155 determines content to provide to the headset 105 for presentation to the user, such as a virtual scene. For example, if the received information indicates that the user has looked to the left, the VR engine 155 generates content for the headset 105 that mirrors or tracks the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the headset 105 or haptic feedback via the VR input interface 140.

Figure 2A:
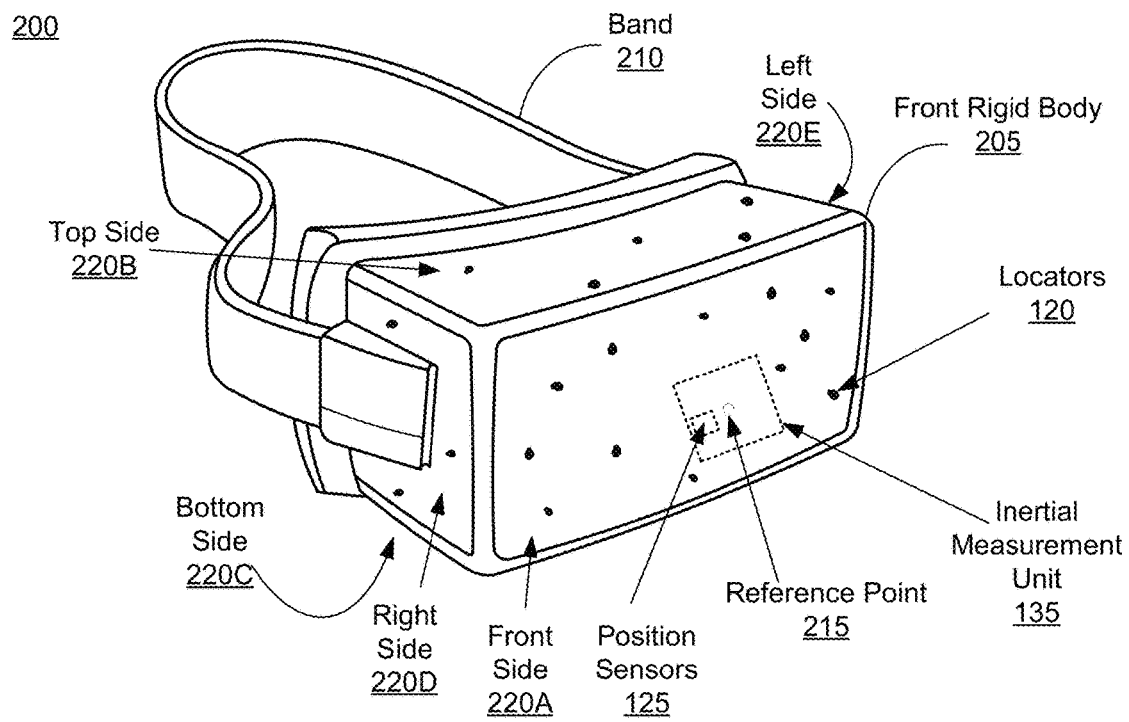
FIG. 2A shows a diagram of a VR headset, in accordance with at least one embodiment.

FIG. 2A is a diagram of VR headset 200, in accordance with at least one embodiment. The VR headset 200 is an embodiment of the headset 105, and includes a front rigid body 205 and a band 210 that goes around a user's head. The front rigid body 205 includes one or more electronic display elements corresponding to the electronic display 115 (not shown in FIG. 2A), the IMU 135, the position sensors 125, and the locators 120. In this example, the position sensors 125 are located within the IMU 135.

The locators 120 are located in fixed positions on the front rigid body 205 relative to one another and relative to the reference point 215. In this example, the reference point 215 is located at the center of the IMU 135. Each of the locators 120 emits light that is detectable by the imaging device 160. The locators 120, or portions of the locators 120, are located on front side 220A, top side 220B, bottom side 220C, right side 220D, and left side 220E of the front rigid body 205, as shown FIG. 2A.

Figure 2B:
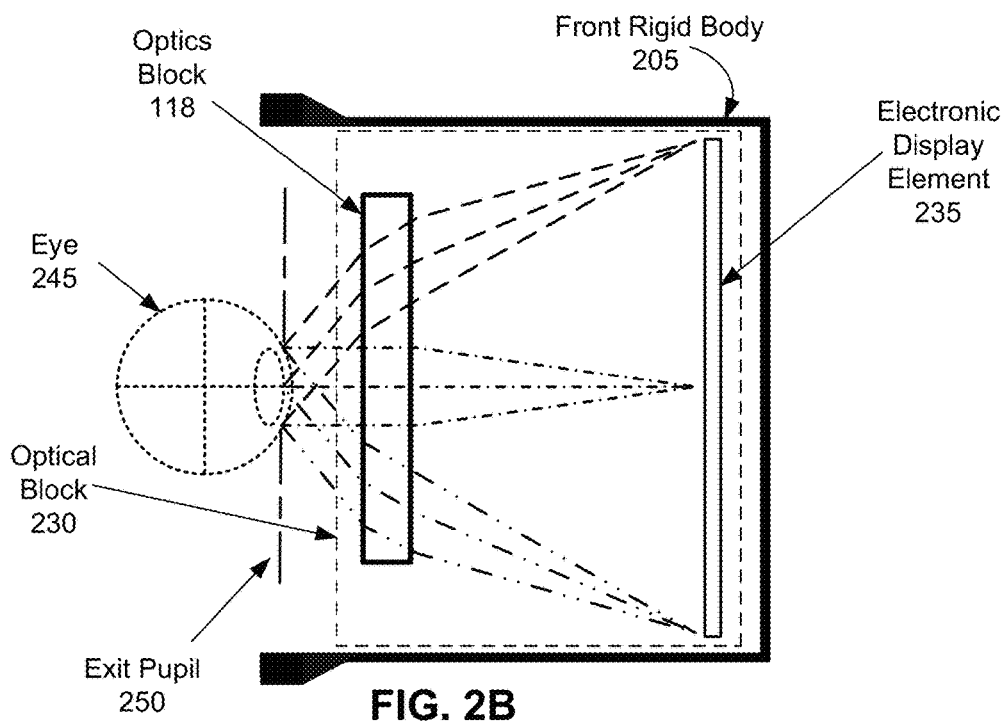
FIG. 2B is a cross section of a front rigid body of the VR headset in FIG. 2A, in accordance with an embodiment.

FIG. 2B is a cross section 225 of the front rigid body 205 of the embodiment of the VR headset 200 shown in FIG. 2A. As shown in FIG. 2B, the front rigid body 205 includes the optical block 230 that provides altered image light to the exit pupil 250. The exit pupil 250 is the location of the front rigid body 205 where the user's eye 245 is positioned. For purposes of illustration, FIG. 2B shows a cross section 225 associated with a single eye 245, but another optical block, separate from the optical block 230, provides altered image light to another eye of the user. The optical block 230 includes the electronic display element 235 of the electronic display 115 and the optics block 118. The electronic display element 235 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

FIG. 3A shows a block diagram of a HMD with two separate display panels, in accordance with at least one embodiment. The block diagram shows two eyes 245 of a user, two optical blocks 118, and two display panels 310 and 320. As illustrated in FIG. 3A, the HMD includes separate left and right eye display areas with a separate left display panel 310 and a right display panel 320. There may be non-uniformities (brightness and/or color non-uniformities) across an individual panel (within the left display panel 310 or within the right display panel 320) as well as between the two panels 310 and 320. The HMD described in this disclosure is assumed to include two separate display panels, one for each eye, as depicted in FIG. 3A unless otherwise specified.

In order to create a stereoscopic image, images displayed on the left and right panels are fused together (overlaid) to create a perception of depth. In such cases, pixels and color sub-pixels of the left and right panels are spatially paired together in a spatial mapping pattern. Image portions displayed on paired pixels or paired sub-pixels are overlaid to form a 3D stereoscopic image. For example, a pixel 311 (or sub-pixel, a set of pixels, or a set of sub-pixels) and a pixel 321 (or sub-pixel, a set of pixels, or a set of sub-pixels) are spatially paired together in the spatial mapping pattern such that they are overlaid to form a 3D stereoscopic image at the user's eyes 245.

It is desirable that the corresponding points between the two display panels that the user sees have the same color and brightness. If non-uniformity exists between the brightness of corresponding pairs of pixels or between color matching of corresponding pairs of sub-pixels (red with red, blue with blue, and green with green) of the left and right display panels (such as those shown in FIG. 3A), the user's eyes may not be able to fuse the images together properly, causing eye strain on the user. As described herein, brightness and luminance are used interchangeably, and are used as an indicator of how bright the display panel appears to users of the HMD. By measuring or characterizing the performance of the two display panels, calibration files can be created during manufacturing process of the panels and then used during run-time to correct the individual panel variations against each other.

FIG. 3B shows a block diagram of a HMD with a single display panel, in accordance with at least one embodiment. The block diagram of FIG. 3B is similar to that of FIG. 3A except that the HMD of FIG. 3B uses a single display panel 350 for its electronic display 115. Even though the HMD of FIG. 3B includes a single display panel 350, the display region of the display panel 350 includes a left half portion and a right half portion that correspond to the separate display panels 310 and 320 of FIG. 3A. Accordingly, the single display panel 350 may also contain non-uniformities (brightness and/or color non-uniformities) similar to the non-uniformity between the panels 310 and 320. For example, a pixel 351 (or sub-pixel, a set of pixels, or a set of sub-pixels) and a pixel 352 (or sub-pixel, a set of pixels, or a set of sub-pixels) that are spatially paired together in the spatial mapping pattern to form a 3D stereoscopic image may not have the same brightness and/or color. An example system to correct any such non-uniformity is described below in conjunction with FIG. 4.

Luminance-Based Non-Uniformity Correction in HMD Display Panels

Figure 4:
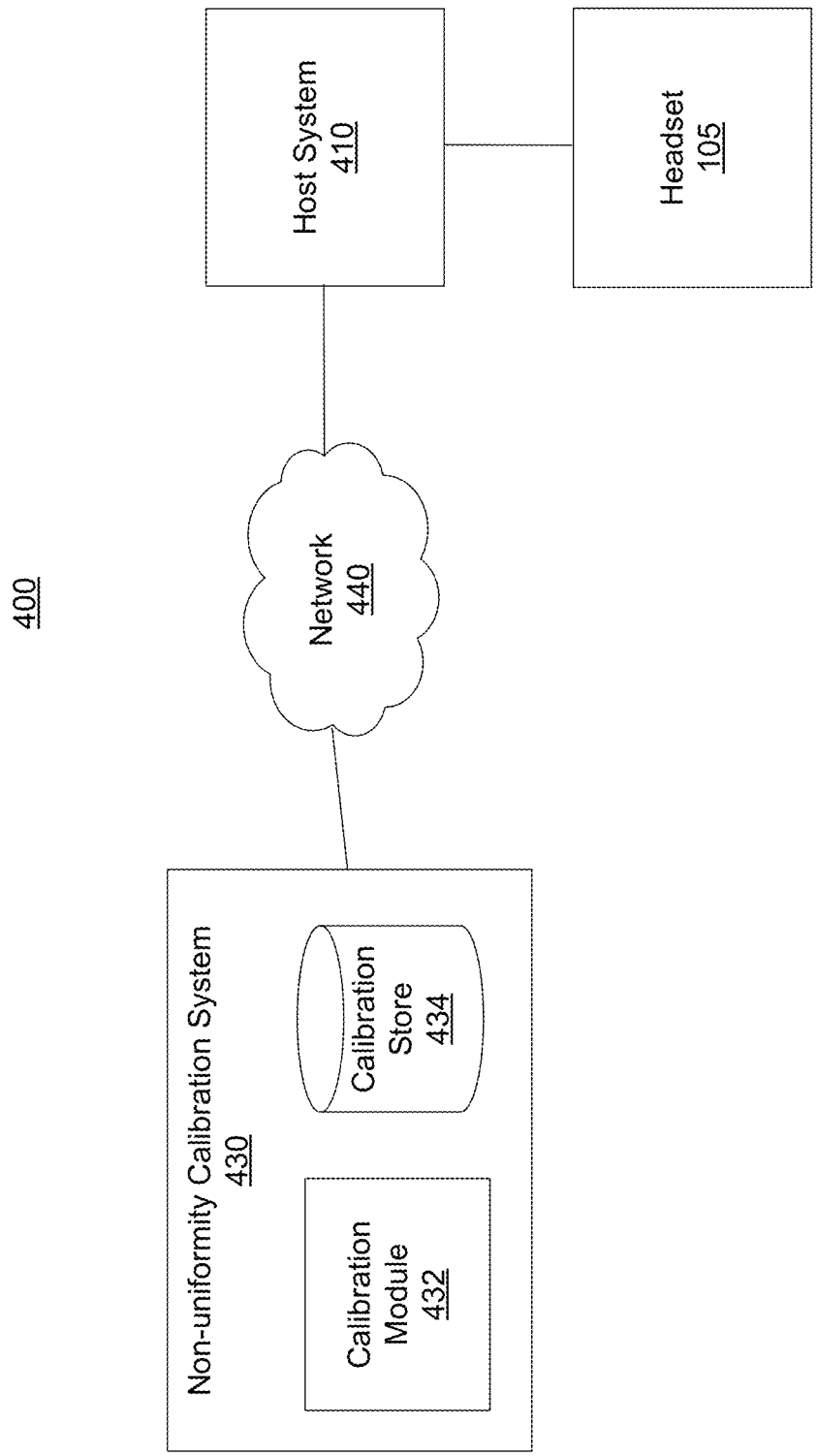
FIG. 4 shows a block diagram of a system for correcting non-uniformity in HMD display panels based on luminance level, in accordance with an embodiment.

FIG. 4 shows a block diagram of a system 400 for correcting non-uniformity in HMD display panels based on luminance level, in accordance with an embodiment. The system 400 includes, among other components, a host system 410, a headset 105, a non-uniformity calibration system 430, and a network 440.

The host system 410 is a computer directly connected to the headset 105 providing hosting services to the headset 105. For example, the host system 410 renders content and provides the rendered content to the headset 105 for presentation to a user wearing the headset 105. The host system 410 may be the VR console 110 described above in conjunction with FIG. 1 or may be a computing system different from the VR console 110. In some embodiments, the host system 410 provides content to the headset 105 for presentation to the user after correcting for any non-uniformities of the electronic display 115. For example, the host system 410 applies non-uniformity correction to content while rendering content for presentation on the headset 105. The headset 105 is same as the headset 105 described in FIG. 1.

The network 440 may comprise any combination of local area and/or wide area networks, using both wired and/or wireless communication systems. In one embodiment, the network 440 uses standard communications technologies and/or protocols. For example, the network 440 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 440 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over network 440 may be represented using any suitable format, such as hypertext markup language (HTML) or extensible markup language (XML). In some embodiments, all or some of the communication links of the network 440 may be encrypted using any suitable technique or techniques.

The non-uniformity calibration system 430 performs calibration of the one or more display panels of the electronic display 115 and stores the calibration data. The non-uniformity calibration system 430 includes, among other components, a calibration module 432 for performing the calibration of the display panels and a calibration store 434 for storing the calibration data. In one embodiment, the non-uniformity calibration system 430 is located outside of the host system 410 and outside of a system environment of the headset 105 (e.g., system environment described above in conjunction with FIG. 1). For example, the non-uniformity calibration system 430 is a cloud-based server that is built, hosted, and delivered through a cloud computing platform over the network 440 such as Internet. Alternatively, the calibration of the one or more display panels of the electronic display 115 is performed locally within the system of the headset 105 (e.g., by VR console 110).

In one or more embodiments, the calibration module 432 performs non-uniformity calibration where the two display panels are paired to each other during a calibration phase. Non-uniformity calibration may be accomplished by measuring or characterizing (e.g., via pre-calibration performed during manufacturing process at factory) the performance of the two display panels in terms of luminance and color. The calibration process involves providing known (e.g., predetermined) and uniform inputs (a full consistent white image and equal red, green, and blue primary inputs) to each of the two display panels. Next, individual measurements of the paired display panels for the colors of interest are taken; these measurements are representative of the individual pixel responses to the same predetermined input (brightness and color). Such measurements from both panels may be taken using a calibrated instrument that gets two-dimensional information responsive to the known inputs that were provided. An example of such an instrument is a 2D imaging colorimeter, such as those produced by Radiant Vision Systems™ or Konica Minolta™. Additional output data, such as gray scale levels, CIE 1931 color space information may also be captured.

The calibration module 432 creates non-uniformity calibration maps or files based on the non-uniformity calibration measurements. The non-uniformity calibration files include measurements for luminance and color display outputs across each of the two panels, representative of the individual pixel responses to the same known (predetermined) input (brightness and color) that was provided. These calibration files include correction factors associated with one or more attributes of the display panels such as color and brightness. The correction factors of the calibration files are then used to correct the individual panel variations to provide brightness uniformity across pixels spanning both panels. For example, the correction factors may include correction voltages corresponding to TFTs driving pixels of the display panel, where the correction voltages represent a change in drive voltages of the TFTs to correct non-uniformities. Alternatively or in addition, these calibration files may be used to correct for non-uniformities or mismatches between spatially matched pixel pairs taken from the two panels that correspond to form the fused stereoscopic image. For instance, to prevent eye strain and to accurately fuse images in a stereoscopic view, the corresponding points between the two panels that the user sees when the left and right images are overlaid, are matched for color and brightness. In some embodiments, the non-uniformity calibration files are created at a sub-pixel level.

The non-uniformity calibration files include measurements representative of the individual pixel responses to the same known (predetermined) input (brightness and color) that was provided at different brightness levels of the display panels. For example, the non-uniformity calibration files may include individual pixel response at brightness levels corresponding to various levels on a brightness scale ranging between 0 and 255 levels, where a level 0 represents black, level 255 represents white, and levels between 0 and 255 represent different shades of gray. As described below, FIGS. 5A and 5B show non-uniformity of a display panel at three different brightness levels corresponding to levels 25, 90, and 255 of the brightness scale.

The non-uniformity calibration maps or files may include calibration data for a low frequency non-uniformity as well as high frequency non-uniformity across the panels. The low frequency non-uniformity refers to a variation of color and/or brightness level across various regions of the entire area of the panel. For example, a color and/or brightness variation between the regions in the left top corner and the right bottom corner of the display panel is low frequency non-uniformity. The high frequency non-uniformity refers to a pixel to pixel variation or a sub-pixel to sub-pixel variation of the attributes of the display panels. The sizes of the non-uniformity calibration files that include calibration data at a sub-pixel level are much larger than those that include calibration data at a pixel level.

The non-uniformity calibration maps or files may be stored in a persistent data storage of the non-uniformity calibration system 430 such as the calibration store 434. For example, the calibration files may be stored in a lookup table (LUT) in the calibration store 434. Alternatively, the non-uniformity calibration maps or files may be stored at a system that is located remotely to both the system of the headset 105 as well as the non-uniformity calibration system 430 (e.g., a cloud-based server). The data of the non-uniformity calibration maps may be at a native resolution such as at a pixel level, a sub-pixel level, a sampled resolution with smaller regions of interest (grid of ROIs), or by using a 2D polynomial function to represent the brightness of the display. In some embodiments, varying values of input voltage may be provided to each of the pixels and corresponding luminance and color outputs may be measured (e.g., as a gamma curve for each pixel of the two panels). These calibration measurements may be taken a priori (e.g., at the factory during manufacturing process) and the files stored in the calibration store 434 or provided separately. In one embodiment, the display panels are calibrated multiple times before the HMDs are shipped to the users. The non-uniformity calibration files may be compressed using one or more compression schemes while being stored at the calibration store 434.

The host system 410 uses the non-uniformity calibration files to correct (compensate for) non-uniformities of the one or more display panels. The non-uniformity correction for a single display panel is described in conjunction with FIGS. 5A and 5B. FIG. 5A shows non-uniformity of a display panel at three different luminance levels before applying non-uniformity calibration, and FIG. 5B shows non-uniformity of the display panel at the three different luminance levels after applying non-uniformity calibration.

The non-uniformity of the display panel shown in each of the FIGS. 5A and 5B represents a pixel-to-pixel (or sub-pixel to sub-pixel) variation of color (or brightness) of the display panel when the display panel is provided with the same known input color (or brightness). The X-axis of each non-uniformity waveform represents a pixel number of the display panel (e.g., up to 1024 pixels) and the Y-axis represents a pixel-to-pixel (or sub-pixel to sub-pixel) variation (e.g., non-uniformity) between adjacent pixels (or adjacent sub-pixels). FIGS. 5A and 5B show non-uniformity at three brightness levels 25, 90, and 255 on the 256-level brightness scale ranging from level 0 (black) to level 255 (white). Human eyes can tolerate some amount of non-uniformity (e.g., pixel-to-pixel variation) and such amount of non-uniformity is represented by lines 502 and 504. Any variation that falls above line 502 or below line 504 is unacceptable to a user.

The non-uniformity 510 of the display panel before correction at level 25 shows that the non-uniformity is more than what users tolerate for pixels corresponding to the entire display panel. The non-uniformity 520 at level 90 shows that the non-uniformity is more than what users tolerate for some pixels of the entire display panel, and the non-uniformity 530 at level 255 (i.e., white) shows that the non-uniformity is within what users tolerate for the entire display panel. As shown in FIG. 5A, the non-uniformity increases and is more noticeable to the user as the brightness level reduces. For example, the non-uniformity corresponding to level 25 is larger than that of level 90, which is in turn larger than that of level 255.

The host system 410 uses the non-uniformity calibration files corresponding to a particular brightness level (e.g., first threshold brightness level) for correcting the non-uniformity of the display panel. For example, the host 410 may use non-uniformity calibration file corresponding to the first threshold brightness level of level 25 of a scale ranging between levels 0 and 255. The host 410 corrects the variation between pixels (or sub-pixels) based on the brightness level of the pixel to be corrected relative to that of the brightness level 25. For example, for all pixels of the panel that are at brightness level of 25 or below (i.e., level 0 through 25), the host 410 corrects non-uniformity corresponding to those pixels using the actual data of the non-uniformity calibration file corresponding to level 25. The correction may include changing a drive voltage of the TFTs that drive the pixels. For example, the non-uniformity calibration file corresponding to level 25 might indicate that the correction needed for pixel 1 at brightness level 25 equates to a correction voltage of 10 mV (either increase or decrease from its nominal input voltage) for the drive voltage driving its corresponding TFT. Similarly, the correction needed for pixel 2 at brightness level 10 might equate to a correction voltage of 5 mV. As pixels 1 and 2 are at brightness levels less than or equal to the first threshold brightness level (e.g., level 25), the full amount of correction voltages of 10 mV and 5 mV is applied to pixels 1 and 2 respectively.

In some embodiments, the host 410 corrects non-uniformity of pixels at brightness levels less than the first threshold brightness level (e.g., level 0 through 24 when the first threshold brightness level is level 25) with a correction amount that is greater than 100% of the actual data corresponding to those pixels in the non-uniformity calibration file. For example, the non-uniformity calibration file might indicate that the correction needed for pixel 2 at brightness level 15 equates to a correction voltage of 5 mV for the drive voltage driving its corresponding TFT. As the brightness level of pixel 2 is less than that of the first threshold brightness level, the actual correction voltage applied to pixel 2 is greater than 5 mV and may be 110% of 5 mV (i.e., 5.5 mV). Other pixels at brightness level of level 10 might be corrected with a correction voltage that is 120% of their corresponding correction voltage in the non-uniformity calibration file.

For pixels at brightness levels higher than the first threshold brightness level (e.g., level 26 through level 255), the host 410 applies a partial amount of correction using the non-uniformity calibration file of level 25. For example, the host 410 may apply a 50% correction for pixels corresponding to level 50, a 20% correction for pixels corresponding to level 90, and may apply no correction for pixels equal to or higher than a second threshold brightness level such as level 255. For pixel 3 at brightness level 50, the non-uniformity calibration file corresponding to level 50 might indicate that the needed correction equates to a correction voltage of 30 mV for the drive voltage driving its corresponding TFT. Because the host 410 applies only a 50% correction for pixels at brightness level 50, pixel 3 is corrected by applying only a 50% of the correction voltage (i.e., 0.5*30 mV=15 mV) to its corresponding TFT input instead of the full correction voltage. Similarly, pixels at brightness level 90 are corrected by applying only 20% of the correction voltages indicated in the non-uniformity calibration file corresponding to level 90.

In some embodiments, the non-uniformity calibration may include changing the display data values corresponding to the pixels instead of changing the analog drive voltages of the TFTs that drive the pixels. For example, the non-uniformity calibration file corresponding to level 25 might indicate that the correction needed for pixel 1 at brightness level 25 equates to a +10% brightness correction (i.e., increase brightness level by 10% from its measured value) for the display data value. Similarly, the correction needed for pixel 2 at brightness level 10 might equate to a −15% brightness correction (i.e., decrease brightness level by 15% from its measured value). In embodiments where for all pixels below or equal to the first threshold brightness level (e.g., level 25), a full amount of correction is applied, pixels 1 and 2 at brightness levels less than or equal to level 25 are applied with +10% and −15% change in their brightness levels respectively. For pixels at brightness levels higher than the first threshold brightness level (e.g., level 26 through level 255), the host 410 applies a partial amount of correction using the non-uniformity calibration file of level 25 similar to the embodiment corresponding to changing TFT drive voltages described above.

In some embodiments, the brightness level corresponding to at least one of: the first threshold brightness level and the second threshold brightness level may change with time. For example, for a first frame of content being presented for display, the first threshold brightness level may be set to level 25, and for a second frame of content being presented for display, the first threshold brightness level may be set to level 35. When the first threshold brightness level changes to level 35, the host 410 uses the non-uniformity calibration file corresponding to level 35 to apply luminance-based non-uniformity correction. Similarly, the second threshold brightness level may be set to level 250 for the first frame and to level 240 for the second frame.

FIG. 5B shows residual non-uniformity of the display panel after applying non-uniformity correction based on luminance level. The non-uniformity 540 of the display panel after correction at level 25 shows a residual non-uniformity of zero. In practice, the panel might have some residual non-uniformity even after the non-uniformity correction but such residual non-uniformity is within the acceptable range for the entire display panel (i.e., within the lines 502 and 504). The non-uniformity 550 at level 90 shows that the residual non-uniformity is also within the acceptable range for the entire display panel. The non-uniformity 560 at level 255 (i.e., white) is the same as that of non-uniformity 530 before correction as the example method does not correct for non-uniformities at full brightness level (i.e., level 255).

In one embodiment, the host system 410 uses the non-uniformity calibration files to correct (compensate for) variations between pixels (or sub-pixels) across the two panels (left and right) to provide brightness (and/or color) uniformity across all pixels spanning both panels at run time. For example, a pixel or group of pixels having the minimum brightness response level among the corresponding pixel pairs in the paired display panels as recorded in the calibration files is identified. The source image data corresponding to the image to be rendered at run-time is then modified or manipulated to degrade or lower the intensity/brightness inputs to the remaining pixels in accordance with (in proportion with) their respective brightness responses as recorded in the calibration files so that after manipulating the image data, all the pixels across both panels have the same brightness response as the pixel(s) with the minimum brightness response. The host 410 may then use the non-uniformity calibration data corresponding to the modified brightness level of the group of pixels to further apply luminance based non-uniformity correction to the brightness (or color) of the group of pixels.

Alternatively or additionally, the host system 410 may use the calibration files to correct for non-uniformities or mismatches between spatially matched pixel pairs taken from the two panels that correspond to form the fused stereoscopic image. For example, the brightness response differences between two pixels of a spatially matched pair may be compensated for by manipulating the image data for the spatially matched pair to be rendered at run-time to degrade or lower the brightness inputs to the pixel that has the greater brightness response characteristics as recorded in the calibration files so that after manipulating the source image data, both the pixels of the pair have the same brightness response as the pixel with the minimum brightness response. The host 410 may then use the non-uniformity calibration data corresponding to the modified brightness level of the pixel pair to further apply luminance based non-uniformity correction to the brightness (or color) of the pixel pair.

Method for Correcting Non-Uniformity in HMD Panels Based on Luminance Level

Figure 6:
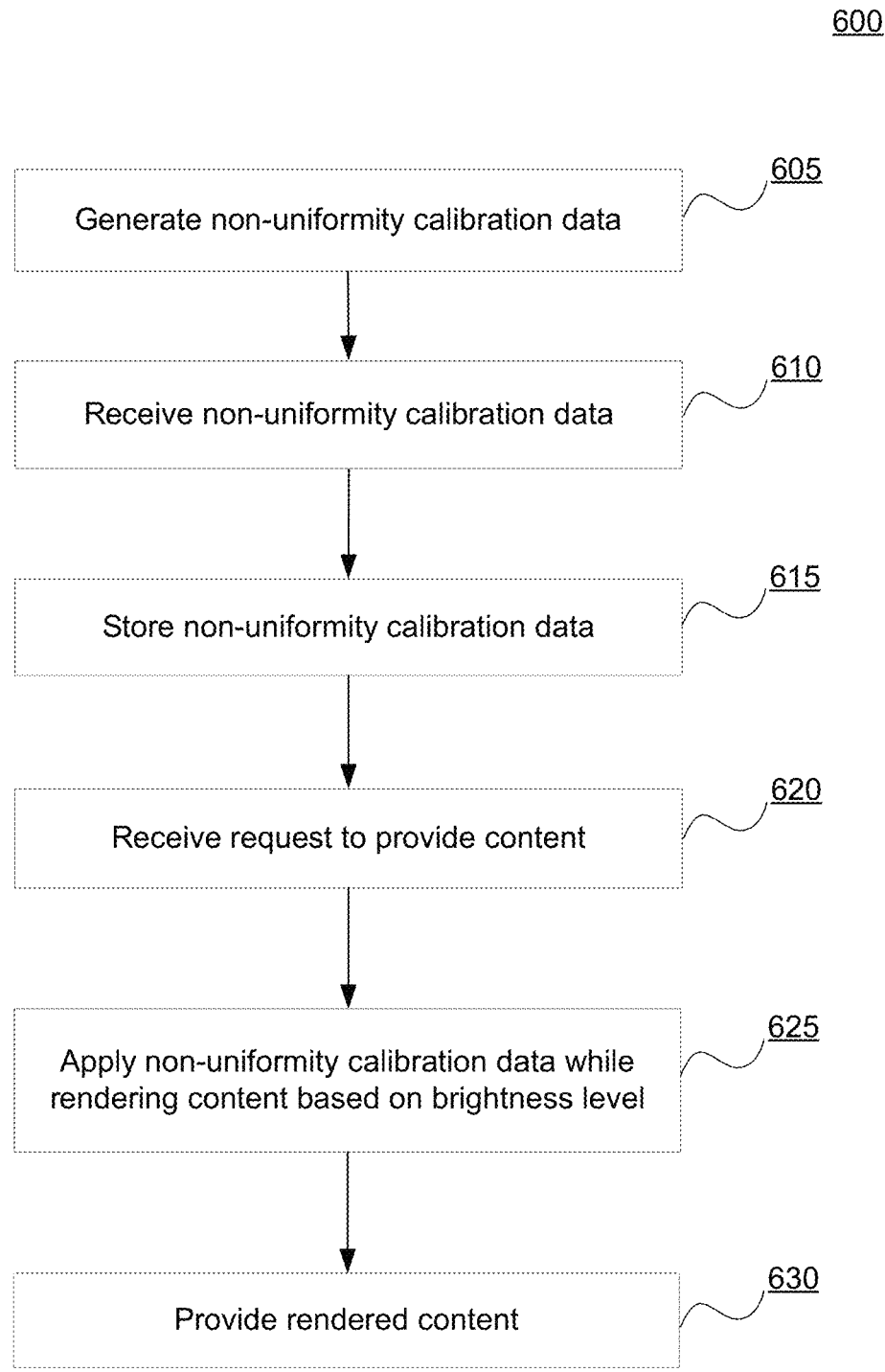
FIG. 6 shows a flowchart of a process for correcting non-uniformity in HMD display panels based on luminance level, in accordance with an embodiment.

FIG. 6 shows flowchart of a process 600 for correcting non-uniformity in HMD display panels based on luminance level, in accordance with an embodiment. In other embodiments, process 600 may include different and/or additional steps than those shown in FIG. 6. Additionally, steps of process 600 may be performed in different orders than the order described in conjunction with FIG. 6 in various embodiments.

When a headset (e.g., headset 105) booting up sequence is initiated, the headset transmits a notification to its host (e.g., host system 410) that the headset 105 has initiated a booting up sequence. In response to receiving the booting up notification, the host 410 transmits a request for non-uniformity calibration data for correcting non-uniformities of the headset 105 display panels. In one embodiment, the non-uniformity calibration data request is sent to the headset 105 that stores the calibration data locally. In such embodiment, the non-uniformity calibration data is transferred to the host 410 via wired (e.g., USB) or wireless communication protocol. Alternatively, the request is sent to non-uniformity calibration system 430 or a system that is located remotely to both the system of the headset 105 as well as the non-uniformity calibration system 430.

The non-uniformity calibration system 430 performs calibration of the one or more display panels of the electronic display 115 to generate 605 the non-uniformity calibration data as described above in conjunction with FIG. 4. The non-uniformity calibration system 430 transmits the requested non-uniformity calibration data to the host 410 and the host 410 receives 610 the calibration data. In embodiments where the non-uniformity calibration data is stored locally on the headset 105, the host 410 receives the non-uniformity calibration data from the host 410. The received non-uniformity calibration data may include one or more non-uniformity calibration files with calibration data for correcting low frequency non-uniformity and/or high frequency non-uniformity across the panels.

The host 410 stores 615 the received calibration data in a persistent data storage of the host 410. In embodiments where the requested non-uniformity calibration data is received from a system remote to the headset 105 (e.g., either non-uniformity calibration system 430 or other remote systems), the steps including the host 410 requesting the calibration data, receiving the requested calibration data, and storing such calibration data may be performed in parallel while the headset is performing the booting up sequence and presents safety information to the user.

After the booting up sequence is complete, the headset 105 transmits a request to the host 410 for providing content to be presented to the user. In response to receiving 620 the request for content, the host 410 applies 625 non-uniformity calibration data to the display panels based on the luminance level of the pixels while the host 410 is rendering content for presentation to the user of the headset 105 such that different calibration data is applied to at least some content having different brightness levels. For example, the host 410 selects a first threshold brightness level (e.g., level 25 on a scale of 0 to 255) and applies full calibration (e.g., full correction voltage) for pixels with brightness less than or equal to the selected first threshold brightness level, and applies partial calibration (e.g., a portion of the correction voltage) for pixels with brightness higher than the selected first threshold brightness level, as described above in conjunction with FIGS. 4, 5A, and 5B.

The host 410 provides 630 the calibrated rendered content to the headset 105 for presentation to the user. As discussed above, the provided rendered content may include content calibrated to correct for non-uniformity errors of the headset's one or more display panels based on the luminance level of the pixels.

Performing non-uniformity calibration based on a luminance level offers advantages over calibration that is constant for all luminance levels. First, a dynamic selection of a brightness level (e.g., for every frame of the presented content) for the non-uniformity calibration provides flexibility for such calibration. For example, the host 410 may select one of the many brightness levels at which the non-uniformity calibration data is generated by the non-uniformity calibration system 430. If the brightness level of the content being presented to the user is predominantly centered on a brightness level that keeps changing with the presented content, an ability to dynamically select the brightness level for non-uniformity calibration provides flexibility to change the non-uniformity calibration as needed.

Second, correcting non-uniformities based on the luminance level of the pixels of the panels allows the host 410 to perform non-uniformity calibration at brightness level as needed. As discussed above in conjunction with FIGS. 5A and 5B, for example, the host 410 may perform full calibration for pixels below (or equal to) the first threshold brightness level and may perform partial calibration for pixels above the first threshold brightness level. The amount of partial calibration varies with the brightness level of the pixels as discussed above in conjunction with FIGS. 5A and 5B.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for correcting non-uniformity of a head-mounted display (HMD), the method comprising:

receiving calibration data for correcting non-uniformity of a first display panel of the HMD, wherein the HMD comprises the first display panel and a second display panel, the first and second display panels each comprising a plurality of pixels, and the calibration data indicating correction amounts for changing a brightness level of content to be displayed to correct non-uniformity between corresponding pixels of the first and second display panels;

storing the received calibration data;

applying at least a portion of the calibration data to content being rendered for display on the first display panel of the HMD, wherein the portion of the calibration data applied is based upon a brightness level of the content being rendered, such that a full portion of the calibration data is applied to a first subset of the content rendered below or equal to a first threshold brightness level, and a partial portion of the calibration data less than the full portion is applied to a second subset of the content rendered above the first threshold brightness level; and transmitting, in response to the application of the calibration data, the calibrated rendered content to the first display panel of the HMD for displaying to a user.

2. The method of claim 1, wherein applying the full portion of the calibration data comprises changing a drive voltage for a first pixel configured to display content at a first brightness level, the drive voltage change for the first pixel represents a full portion of a first correction voltage corresponding to the first pixel, the first correction voltage derived from calibration data corresponding to the first brightness level, and the first brightness level below or equal to the first threshold brightness level.

3. The method of claim 1, wherein applying the partial portion of the calibration data comprises changing a drive voltage for a second pixel configured to display content at a second brightness level, the drive voltage change for the second pixel represents a partial portion of a second correction voltage corresponding to the second pixel, the second correction voltage derived from calibration data corresponding to the second brightness level, and the second brightness level above the first threshold brightness level.

4. The method of claim 3, wherein changing the drive voltage for the second pixel comprises changing the drive voltage by a first percentage of the second correction voltage when the second pixel is configured to display content at the second brightness level, and changing the drive voltage by a second percentage of the second correction voltage when the second pixel is configured to display content at a third brightness level higher than the second brightness level, the second percentage lower than the first percentage.

5. The method of claim 3, wherein applying the partial portion of the calibration data for the second subset of the content rendered above the first threshold brightness level comprises applying no calibration for a portion of the second subset of the content rendered above or equal to a second threshold brightness level, the second threshold brightness level higher than the first threshold brightness level.

6. The method of claim 5, wherein the first threshold brightness level or the second threshold brightness level changes with time.

7. The method of claim 1, wherein the calibration data is received in response to receiving a request for providing content to be displayed on the first display panel of the HMD.

8. The method of claim 1, wherein the calibration data for correcting non-uniformity of the first display panel is associated with at least one of brightness and color of the first display panel.

9. The method of claim 8, wherein the calibration data further indicates correction amounts for correcting non-uniformity of the first display panel corresponding to a pixel-to-pixel variation representing a difference between adjacent pixels of the first display panel, or a sub-pixel to sub-pixel variation representing a difference between adjacent sub-pixels of the first display panel, each pixel of the first display panel comprising a plurality of sub-pixels.

10. An apparatus comprising:
a processor; and
a non-transitory computer-readable storage medium storing executable computer program instructions for correcting non-uniformity of a head-mounted display (HMD), the instructions executable by the processor and causing the processor to perform a method comprising:
receiving calibration data for correcting non-uniformity of a first display panel of the HMD, wherein the HMD comprises the first display panel and a second display panel, the first and second display panels each comprising a plurality of pixels, and the calibration data indicating correction amounts for changing a brightness level of content to be displayed to correct non-uniformity between corresponding pixels of the first and second display panels;
storing the received calibration data;
applying at least a portion of the calibration data to content being rendered for display on the first display panel of the HMD, wherein the portion of the calibration data applied is based upon a brightness level of the content being rendered, such that a full portion of the calibration data is applied to a first subset of the content rendered below or equal to a first threshold brightness level, and a partial portion less than the full portion of the calibration data is applied to a second subset of the content rendered above the first threshold brightness level; and
transmitting, in response to the application of the calibration data, the calibrated rendered content to the first display panel of the HMD for displaying to a user.

11. The apparatus of claim 10, wherein applying the full portion of the calibration data comprises changing a drive voltage for a first pixel configured to display content at a first brightness level, the drive voltage change for the first pixel represents a full portion of a first correction voltage corresponding to the first pixel, the first correction voltage derived from calibration data corresponding to the first brightness level, and the first brightness level below or equal to the first threshold brightness level.

12. The apparatus of claim 10, wherein applying the partial portion of the calibration data comprises changing a drive voltage for a second pixel configured to display content at a second brightness level, the drive voltage change for the second pixel represents a partial portion of a second correction voltage corresponding to the second pixel, the second correction voltage derived from calibration data corresponding to the second brightness level, the second brightness level above the first threshold brightness level.

13. The apparatus of claim 12, wherein changing the drive voltage for the second pixel comprises changing the drive voltage by a first percentage of the second correction voltage when the second pixel is configured to display content at the second brightness level, and changing the drive voltage by a second percentage of the second correction voltage when the second pixel is configured to display content at a third brightness level higher than the second brightness level, the second percentage lower than the first percentage.

14. The apparatus of claim 12, wherein applying the partial portion of the calibration data for the second subset of the content rendered above the first threshold brightness level comprises applying no calibration for a portion of the second subset of the content rendered above or equal to a second threshold brightness level, the second threshold brightness level higher than the first threshold brightness level.

15. The apparatus of claim 14, wherein the first threshold brightness level or the second threshold brightness level changes with time.

16. The apparatus of claim 10, wherein the calibration data for correcting non-uniformity of the first display panel is associated with at least one of brightness and color of the first display panel.

17. The apparatus of claim 16, wherein the calibration data further indicates correction amounts for correcting non-uniformity of the first display panel corresponding to a pixel-to-pixel variation representing a difference between adjacent pixels of the first display panel or a sub-pixel to sub-pixel variation representing a difference between adjacent sub-pixels of the first display panel, each pixel of the first display panel comprising a plurality of sub-pixels.

18. A computer program product comprising a non-transitory computer-readable storage medium storing executable computer program instructions for correcting non-uniformity of a head-mounted display (HMD), the instructions executable by a processor and causing the processor to perform a method comprising:
- receiving calibration data for correcting non-uniformity of a first display panel of the HMD, wherein the HMD comprises the first display panel and a second display panel, the first and second display panels each comprising a plurality of pixels, and the calibration data indicating correction amounts for changing a brightness level of content to be displayed to correct non-uniformity between corresponding pixels of the first and second display panels;
- storing the received calibration data;
- applying at least a portion of the calibration data to content being rendered for display on the first display panel of the HMD, wherein the portion of the calibration data applied is based upon a brightness level of the content being rendered, such that a full portion of the calibration data is applied to a first subset of the content rendered below or equal to a first threshold brightness level, and a partial portion less than the full portion of the calibration data is applied to a second subset of the content rendered above the first threshold brightness level; and
- transmitting, in response to the application of the calibration data, the calibrated rendered content to the first display panel of the HMD for displaying to a user.

* * * * *